(12) United States Patent
Shima et al.

(10) Patent No.: US 7,398,189 B2
(45) Date of Patent: Jul. 8, 2008

(54) REPORT MANAGEMENT DEVICE, REPORT MANAGEMENT PROGRAM, AND REPORT MANAGEMENT METHOD

(75) Inventors: Tatsuro Shima, Kawasaki (JP); Miki Ichikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/698,852

(22) Filed: Jan. 29, 2007

(65) Prior Publication Data

US 2008/0103731 A1 May 1, 2008

(30) Foreign Application Priority Data

Oct. 30, 2006 (JP) ............... 2006-293776

(51) Int. Cl.
*G06F 15/00* (2006.01)
(52) U.S. Cl. .................................... 702/189
(58) Field of Classification Search ............... 702/181, 702/182, 189
See application file for complete search history.

(56) References Cited

U.S. PATENT DOCUMENTS

| 7,003,437 | B2 | 2/2006 | Ichikawa et al. |
| 7,092,851 | B2 | 8/2006 | Ichikawa et al. |
| 2005/0108193 | A1* | 5/2005 | Schauerte et al. ............. 707/1 |
| 2005/0159930 | A1 | 7/2005 | Ichikawa et al. |
| 2006/0111876 | A1 | 5/2006 | Ichikawa et al. |

FOREIGN PATENT DOCUMENTS

| JP | 09-179849 | 7/1997 |
| JP | 2005-031768 | 2/2005 |
| JP | 2005-208766 | 8/2005 |
| JP | 2005-276068 | * 10/2005 |

* cited by examiner

*Primary Examiner*—Michael P Nghiem
(74) *Attorney, Agent, or Firm*—Staas & Halsey LLP

(57) ABSTRACT

A report management device and method efficiently creating reports by reusing information for reports is provided. The report management device manages a report on information concerning a product and includes an environmental information obtaining section obtaining first information as information concerning a first product, a matching management section determining whether or not a first report on the first product as a report of a predetermined report type can be created based on order of report type priorities set as order of priorities given to plural report types that can be created. The report management device includes an input assist section creating, if the matching management section determines that the first report can be created, the first report based on the first information obtained by the obtaining section and stores the information of the first report.

18 Claims, 13 Drawing Sheets

FIG.6

UPDATE HISTORY

| PRODUCT ID | INFORMATION TYPE | UPDATED DATE | UPDATER | REPORT ID |
|---|---|---|---|---|
| REF-TEST01 | BASIC INFORMATION | 2006/○/○ | USER01 | WG-r1500,WG-r1501,WG-r1502 |
| REF-TEST01 | SPEC INFORMATION | 2006/○/○ | USER01 | WG-r1500,WG-r1501,WG-r1502 |
| REF-TEST01 | POWER INFORMATION | 2006/○/○ | USER01 | WG-r1500,WG-r1501,WG-r1502 |
| REF-TEST02 | BASIC INFORMATION | 2006/○/○ | USER02 | WG-r1503,WG-r1504 |
| REF-TEST02 | SPEC INFORMATION | 2006/○/○ | USER02 | WG-r1503,WG-r1504 |
| REF-TEST02 | POWER INFORMATION | 2006/○/○ | USER02 | WG-r1503,WG-r1504 |

FIG.7

PRODUCT INFORMATION LIST

| | BASIC INFORMATION | | | PRODUCT ID | | | POWER INFORMATION | | |
|---|---|---|---|---|---|---|---|---|---|
| PRODUCT ID | UPDATED DATE | UPDATER | | UPDATED DATE | UPDATER | | UPDATED DATE | UPDATER |
| REF-TEST01 | 2006/O/O | USER01 | DETAILS | 2006/O/O | USER01 | DETAILS | 2006/O/O | USER01 |
| REF-TEST02 | 2006/O/O | USER02 | DETAILS | 2006/O/O | USER02 | DETAILS | 2006/O/O | USER02 |

FIG.8

INDIVIDUAL PRODUCT INFORMATION DISPLAY

INDIVIDUAL PRODUCT INFORMATION
(POWER INFORMATION)

| INDIVIDUAL PRODUCT INFORMATION (POWER) | VALUE |
|---|---|
| POWER AT ○○ (TIME) | X |
| POWER CONSUMPTION AT ○○ SECTION | Y |
| POWER CONSUMPTION IN ○○ MODE | Z |

FIG.9

| INDIVIDUAL PRODUCT INFORMATION COMPENSATION | | ☐ ☒ |
|---|---|---|
| INDIVIDUAL PRODUCT INFORMATION COMPENSATION (POWER INFORMATION) | | |
| SPECIFY A CSV FILE [            ]  [UPLOAD] | | |
| ENTRY GUIDE | | |
| INDIVIDUAL PRODUCT INFORMATION (POWER) | ENTRY REGULATIONS |
| POWER AT ○○ (TIME) | SINGLE-BYTE CHARACTERS (6-DIGIT INTEGER, 3 OR LESS DECIMAL PLACES) |
| POWER CONSUMPTION AT ○○ SECTION | SINGLE-BYTE CHARACTERS (6-DIGIT INTEGER, 3 OR LESS DECIMAL PLACES) |
| POWER CONSUMPTION IN ○○ MODE | SINGLE-BYTE CHARACTERS (6-DIGIT INTEGER, 3 OR LESS DECIMAL PLACES) |

FIG.10

REPORT LIST

[INPUT REPORT] [DOWNLOAD] [CREATE A NEW REPORT] [MAKE REFERENCE] [REQUEST APPROVAL]

REPORT LIST

| SELECTION | REPORT ID | REPORT TYPE | NUMBER OF MODELS | REPRESENTATIVE MODEL ID | UPDATED DATE | UPDATER | FIXING FLAG |
|---|---|---|---|---|---|---|---|
| ◎ | WG-r1500 | REPORT 01 | 1 | REF-TEST01 | 2006/○/○ | USER01 | OK |
| ◎ | WG-r1501 | REPORT 02 | 1 | REF-TEST01 | 2006/○/○ | USER01 | OK |
| ◎ | WG-r1502 | REPORT 03 | 1 | REF-TEST01 | 2006/○/○ | USER01 | NG |
| ◎ | WG-r1503 | REPORT 01 | 1 | REF-TEST02 | 2006/○/○ | USER02 | OK |
| ◎ | WG-r1504 | REPORT 02 | 1 | REF-TEST02 | 2006/○/○ | USER03 | NG |

FIG.11

CREATE A NEW REPORT

CREATE A NEW REPORT

REPRESENTATIVE MODEL ID SEARCH [REF-TEST01]  SEARCH

SELECT A REPORT TYPE [REPORT 01 ▶]
REPORT 01
REPORT 02
REPORT 03

SELECT A PRODUCT (OR PRODUCTS)

REF-TEST01
REF-TEST01-1
REF-TEST01-2
REF-TEST01-3
REF-TEST01-4

FIG.12

REPORT INPUT

REPORT INPUT

SAVE DB

REDISPLAY FROM DB

FIX

DOWNLOAD

USER INFORMATION

RESPONSIBLE PERSON

POST

AFFILIATION

CONTACT ADDRESS

PRODUCT ID: REF-TEST01

| INDIVIDUAL PRODUCT INFORMATION (POWER) | VALUE |
|---|---|
| POWER AT ○○ (TIME) | X |
| POWER CONSUMPTION AT ○○ SECTION | Y |
| POWER CONSUMPTION IN ○○ MODE | Z |

FIG.13

REPORT CREATION STATE LIST

REPORT CREATION STATE LIST

| PRODUCT ID | REPORT 01 | REPORT 02 | REPORT 03 |
|---|---|---|---|
| REF-TEST01 | WG-r1500(FIXED) | WG-r1501(FIXED) | WG-r1502(BEING CREATED) |
| REF-TEST01-01 | WG-r1500(FIXED) | WG-r1501(FIXED) | WG-r1502(BEING CREATED) |
| REF-TEST01-02 | WG-r1500(FIXED) | WG-r1501(FIXED) | WG-r1502(BEING CREATED) |
| REF-TEST01-03 | WG-r1500(FIXED) | WG-r1501(FIXED) | WG-r1502(BEING CREATED) |
| REF-TEST01-04 | WG-r1500(FIXED) | WG-r1501(FIXED) | WG-r1502(BEING CREATED) |
| REF-TEST02 | WG-r1503(FIXED) | WG-r1504(BEING CREATED) | (NOT CREATED) |
| REF-TEST02-01 | WG-r1503(FIXED) | WG-r1504(BEING CREATED) | (NOT CREATED) |

REPORT MANAGEMENT DEVICE, REPORT MANAGEMENT PROGRAM, AND REPORT MANAGEMENT METHOD

BACKGROUND OF THE INVENTION

1. Field of the Invention

The present invention relates to a report management device, a report management program, and a report management method which manage a report on an industrial product.

2. Description of the Related Art

In recent years, ordinary consumers have become more interested in influence on global environments from industrial products. Manufactures are therefore demanded to disclose qualification depending on various environmental labels approved by third party organizations or to disclose environmental assessment information (hereinafter simply referred to as environmental information) concerning individual products. Therefore, at work places of developers of products and in environmental divisions relating to disclosure of environmental information, man-hours spent for demanded environmental work are increasing dramatically. Work concerning such disclosure and environmental work have to be dealt with efficiently.

Meanwhile, manufacturers usually carry out product evaluations for acquiring environmental labels, or prevention of environmental pollution and environmental assessment (such as an initial evaluation hereinafter referred to as an environmental evaluation) for reducing influence on environments in stages of product design/development. Ordinarily, results of conducted environmental evaluations are summarized in environmental evaluation reports which are used for application for issuance of environmental labels or in assessment reports. After such environmental evaluation reports are submitted, the reports are individually managed as documents by use of a document management system or the like. When data written in an environmental evaluation report are required later, a responsible person picks up environmental evaluation reports concerned and subjects the reports to secondary use by processing data forms so as to suit necessary forms or the like.

Jpn. Pat. Appln. Laid-Open Publication No. 2005-208766 (Patent Document 1) discloses an environmental load evaluation system relevant to the invention. This environmental load evaluation system is capable of evaluating environmental load information, covering a situation as follows. For example, the situation is that a plurality of parts actually have respectively variants in environmental load characteristics even though those parts all have one uniform design. In environmental load evaluations, this system enables appropriate handling of parts that have one equal part number and respectively different environmental load characteristics.

However, since lots of people are usually related to products development, pieces of information (backdata) necessary for environmental evaluations are gathered only little by little. Responsible persons charged in environmental evaluations cannot carry out evaluations before all backdata held by individual responsible persons are collected up. In other words, environmental evaluations cannot be started before all backdata are prepared completely. Further, there is a problem that updaters, updated dates, and fixed states of reports are difficult to know because a huge number of persons are related to evaluations.

In the aspect of product management, for example, when a lot of products are handled or when a lot of new models are added, there are omissions when specifying products as targets on which environmental reports are to be created. Such omissions result in further omissions in application forms for environmental labels.

There are cases that one environmental evaluation report is created by a plurality of responsible persons and different responsible persons from those in charge of an ordinary model are in charge of an enhanced model. In such cases, evaluated levels can have variants in environmental evaluation reports (in other words, evaluated levels disagree between environmental evaluation reports). In addition, when evaluation data which once have been used are used later again (for purpose of internal or external information distribution or for making inquiries), necessary information has to be retrieved again from sets of environmental evaluation reports and be processed so as to fit purposes. Therefore, environmental management divisions in charge of information disclosure work further necessitate additional man-hours.

Techniques disclosed in the above publication do not deal with management from view points as described above. Therefore, a report needs to be created for each product or each purpose even though created reports are similar to each other.

SUMMARY OF THE INVENTION

The present invention has been made to address problems as described above and has an object of providing a report management device, a report management program, and a report management method which are capable of creating reports efficiently by reusing information for reports.

According to one aspect of the invention to address the above problems, there is provided a report management device that manages a report on information concerning a product, comprising: an obtaining section that obtains first information as information concerning a first product; a determination section that determines whether or not a first report on the first product as a report of a predetermined report type can be created, based on order of report type priorities set as order of priorities given to plural report types that can be created; and a creation section that creates, if the determination section determines that the first report can be created, the first report based on the first information obtained by the obtaining section and stores the information of the first report.

According to another aspect of the invention, there is provided a report management program that causes a computer to execute management of a report on information concerning a product, the program causing the computer to execute: an obtaining step that obtains first information as information concerning a first product; a determination step that determines whether or not a first report on the first product as a report of a predetermined report type can be created, based on order of report type priorities set as order of priorities given to plural report types that can be created; and a creation step that creates, if the determination step determines that the first report can be created, the first report based on the first information obtained by the obtaining step and stores the information of the first report.

According to still another aspect of the invention, there is provided a report management method that manages a report on information concerning a product, comprising: an obtaining step that obtains first information as information concerning a first product; a determination step that determines whether or not a first report on the first product as a report of a predetermined report type can be created, based on order of report type priorities set as order of priorities given to plural report types that can be created; and a creation step that creates, if the determination step determines that the first report can be created, the first report based on the first information obtained by the obtaining step and stores the information of the first report.

According to the invention, reports can be created efficiently by reusing information for reports.

BRIEF DESCRIPTION OF THE DRAWINGS

FIG. 6 shows an example of an update history screen according to the invention;

FIG. 7 shows an example of a product information list screen according to the invention;

FIG. 8 shows an example of an individual product information display screen according to the invention;

FIG. 9 shows an example of an individual product information compensation screen according to the invention;

FIG. 10 shows an example of a report list screen according to the invention;

FIG. 11 shows an example of a new report creation screen according to the invention;

FIG. 12 shows an example of a report input screen according to the invention; and FIG. 13 shows an example of a report creation state list screen according to the invention.

DETAILED DESCRIPTION OF THE PREFERRED EMBODIMENTS

An embodiment of the present invention will now be described below with reference to the drawings.

A user of a product environmental information collection system (e.g., a report management device) in the embodiment is a responsible person in a design division or environmental division.

Figure 1:
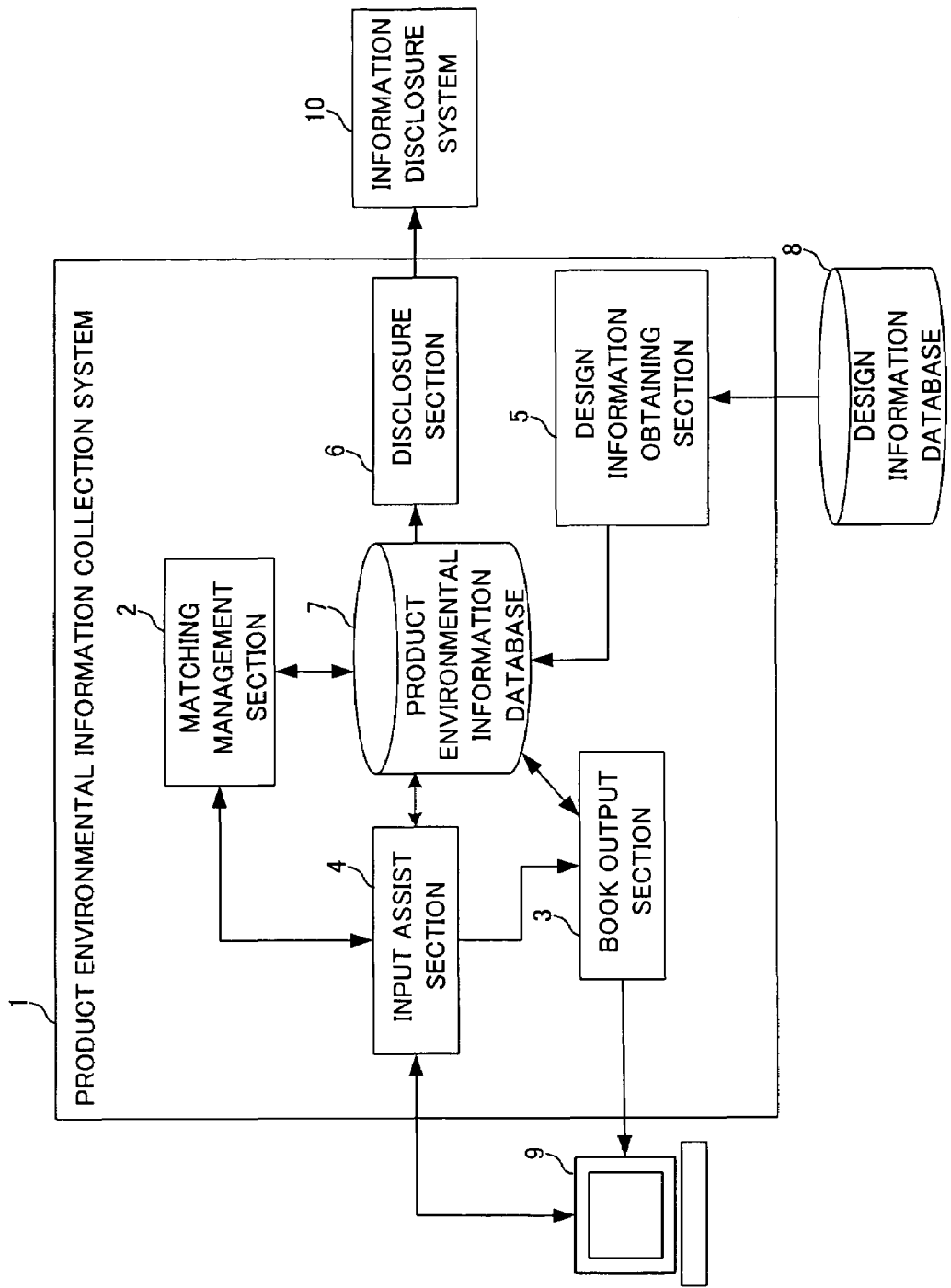
FIG. 1 is a block diagram showing an example of configuration of a product environmental information collection system according to the invention.

At first, FIG. 1 shows a configuration of the product environmental information collection system according to the embodiment. The product environmental information collection system 1 includes a matching management section 2. The matching management section 2 checks input priorities of relevant reports when creating a new environmental evaluation report (hereinafter simply referred to as a report), and also checks fixing requirements when input of a report is finished. Also, the matching management section 2 manages an update history of individual information of products and makes determination about a critical event (postponement or cancel of productization). Further, the matching management section 2 automatically or manually updates groups of existing products depending on update of product states and also manages states of reports.

The product environmental information collection system 1 has a book output section 3 and an input assist section 4. The book output section 3 outputs a created report as a book. The input assist section 4 assists users to input data and displays a work screen on a user terminal 9. The product environmental information collection system 1 further has a design information obtaining section 5 to obtain a product specification from a design information database 8 provided outside the product environmental information collection system 1. The product environmental information collection system 1 still has a disclosure section 6 which provides information to an external information disclosure system 10. The product environmental information collection system 1 has a product environmental information database 7 which stores and manages report type information and states of reports such as types of reports (report types), input priorities, and fixing requirements, as well as product states such as basic information of each product group, individual product information ("spec information", "power information", etc.) of each product, postponement of publication, and cancel of productization. A user terminal 9 is connected to the product environmental information collection system 1 via a network, and allows users to carry out operation through the user terminal 9. The information disclosure system 10 discloses, to the network, reports provided by the product environmental information collection system 1.

Figure 2:
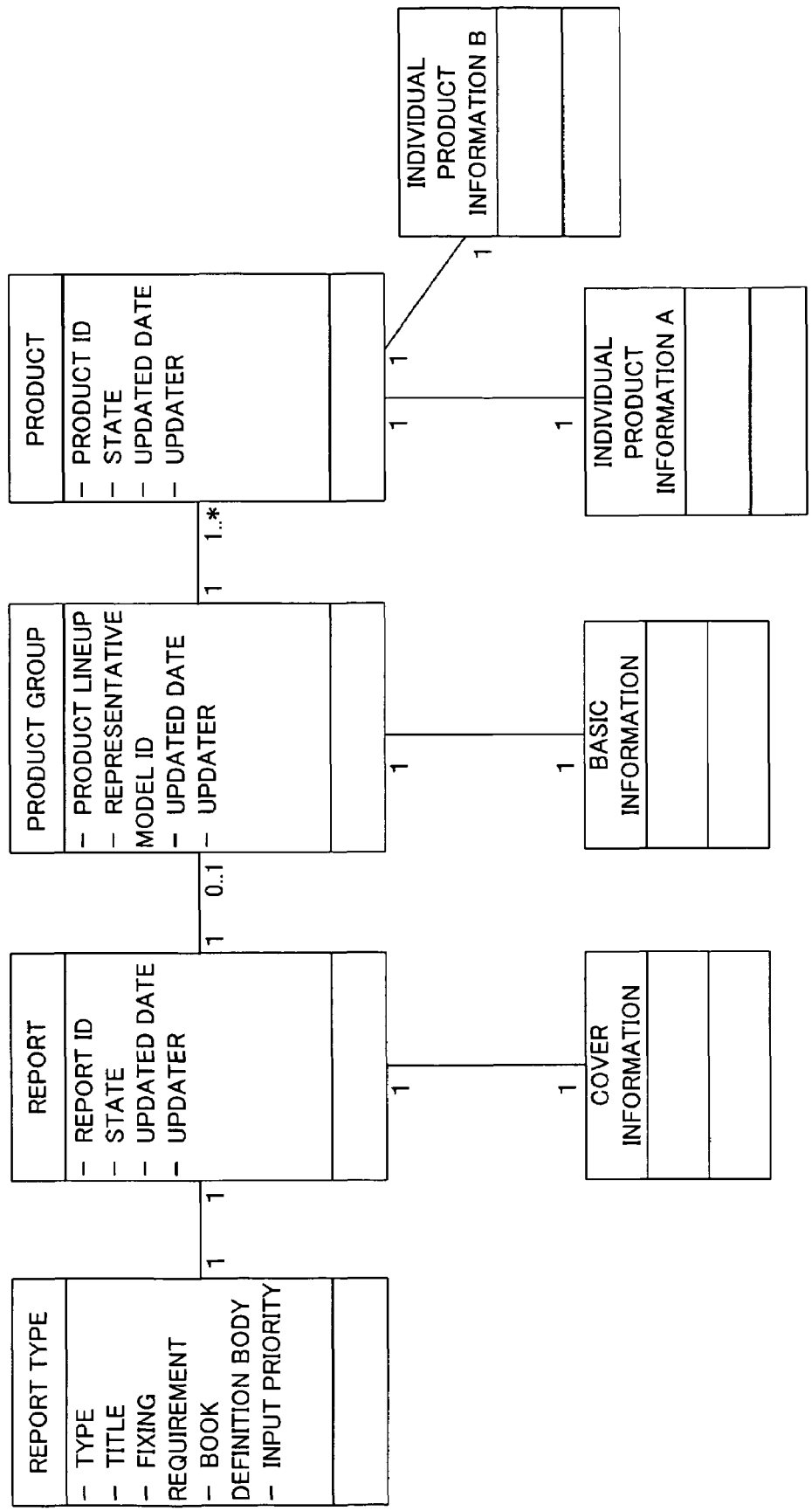
FIG. 2 is a class diagram showing a configuration example of data used in a product environmental information collection system according to the invention.

Next, FIG. 2 is a class view showing a data configuration of information stored and managed in the product environmental information database 7. The product environmental information database 7 contains data such as report types, reports, product groups, products, cover information, basic information, individual product information A, and individual product information B.

Attributes of "report type" are "type", "title", "fixing requirement", "book definition body", and "input priority". Ranks of "input priority" are "1", "2", "3" or so. If a report given the highest input priority (e.g., a report with the input priority "1") does not satisfy the "fixing requirement" and if the state of the "report" described later is not "fixed", a report given the second highest input priority (e.g., a report with the input priority "2") cannot be created. For example, there are reports for in-house use and external use. If the amount of information contained in a report for external use is greater than that contained in an in-house use report or if items required for an external use report are contained in a report for in-house use, the input priority of the report for in-house use is defined to be higher than that for external use. If reports for external use are prepared in this manner, labor for preparing reports for external use can be reduced. The "book definition body" is a format for printing or displaying a report as a book.

Further, a "fixing requirement" and a "book definition body" can be registered and managed as attributes of a "report type". Then, maintenance of a huge number of evaluation items which require expertise and management of correlative or reiterative items between reports can be effectively carried out, for example, when evaluation items of reports are revised.

Further, a "report" has attributes of "report ID", "state" (including values: "not created", "being created", and "fixed"), "updated date", and "updater". The "report" is related to "cover information" and "report type" as described previously. The "cover information" is information inserted in a cover page of a report, such as application year/month/date.

The "product group" has attributes of "product lineup" (e.g., product IDs of products if plural similar products exist), a "representative model ID" (of a representative product if plural similar products exist), "updated date", "updater". The "product group" is related to "basic information", "report", and "product". The "basic information" is information concerning an environmental evaluation common to a related product group. A product group is a set of similar products that can have sharable common basic information. If a report is created for a representative model, reports on other products in the same product group as that of the representative model can then be automatically created by use of "individual product information". Further, as soon as design work is completed, basic information common to a product group is obtained from the design information database 8 by the design information obtaining section 5 and registered in the product environmental information database 7.

The "product" has attributes of "product ID", "state" (having values "publication start", "publication postponement", and "productization cancel"), "updated date", and "updater". The "product" is related to "product group" and "individual product information" (individual product information A and B).

For example, the "individual product information A" is "spec information" (containing information which varies depending on products, such as CPU frequency, memory capacity, etc.) The "individual product information B" contains, for example, information necessary for creating reports, such as "power information" (containing information such as power consumption during operation and/or in a low-power mode), "inclusion information" (containing contents of chemical materials or the like), etc. In this manner, the "individual product information" and "product" are related to each other, and evaluation targets such as "power information" and "inclusion information" which are regarded as effecting environments are classified by sorting. As a result, a case of including plural target information items to obtain can be coped with, and operationality for users can be improved. Data of "product" and "individual product information" each are periodically obtained from the design information database 8 by the design information obtaining section 5.

Further, numerical values at interconnection lines in FIG. 2 express multiplicity. For example, one "report" exists for one "report type", and one or no "product group" exists for one "report". Likewise, more than one "product" exist for one "product group".

Figure 3:
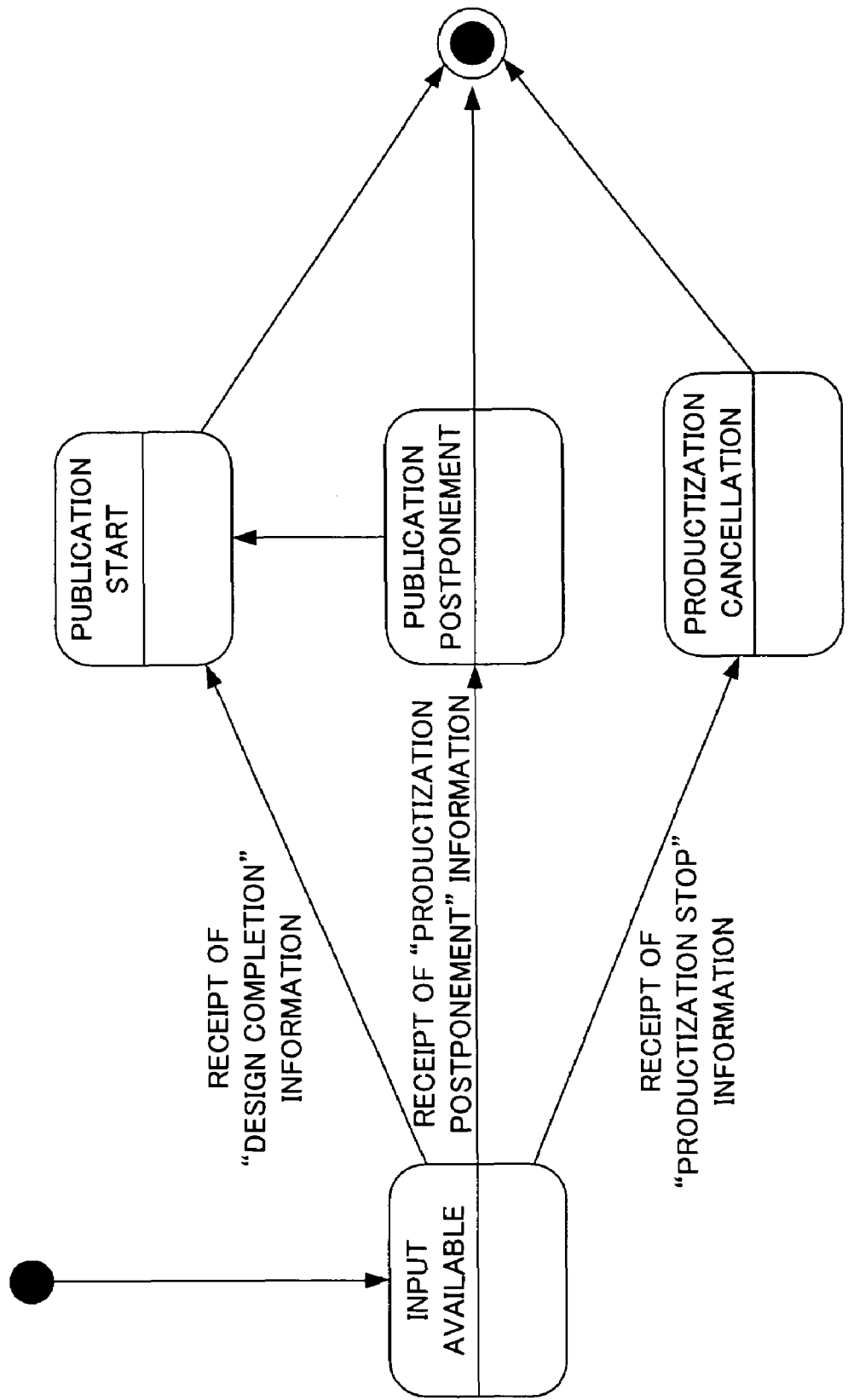
FIG. 3 shows an example of transition of product states according to the invention.

Transition of the "state" of a "product" is shown in FIG. 3. At first, the "state" starts in an "input available" state indicating that input of a report is allowed. Assume a case that the design information obtaining section 5 receives information notifying "design completion" of a certain product from the design information database 8. Then, the "state" of the product is shifted to "publication start". Then, reports and individual product information about the product are opened to user terminals 9 of related persons by the input assist section 4. Assume another case that the design information obtaining section 5 receives information notifying "productization postponement" of a certain product from the design information database 8. Then, the "state" of the product is shifted to "publication postponement" and further to "publication start". Reports of the product are kept open. Assume still another case that the design information obtaining section 5 receives information notifying "productization cancel" of a certain product from the design information database 8. Then, the "state" of the product is shifted to "productization cancel". Thereafter, the product is not published any more.

Figure 4:
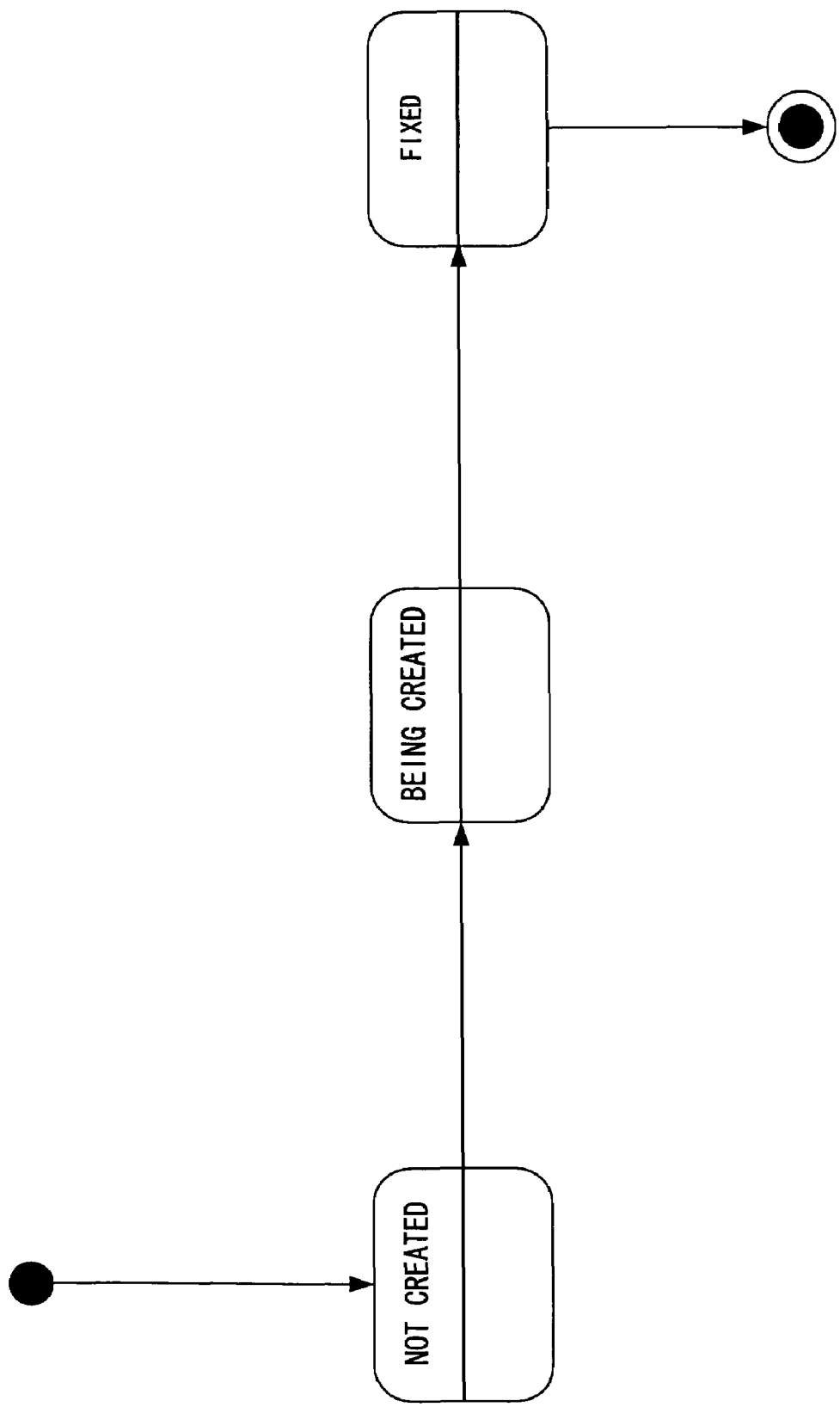
FIG. 4 shows an example of transition of states of a report according to the invention.

Next, FIG. 4 shows transition of the "state" in the "report" described above. At first, the "state" starts from "not created" as an initial state indicating that a related report has not been created yet. If creation of a report is started in the "not created" state, the "state" of the report is shifted to "being created". A fixing check is thereafter carried out about the report. If the report passes the check, the "state" is shifted to "fixed".

Figure 5:
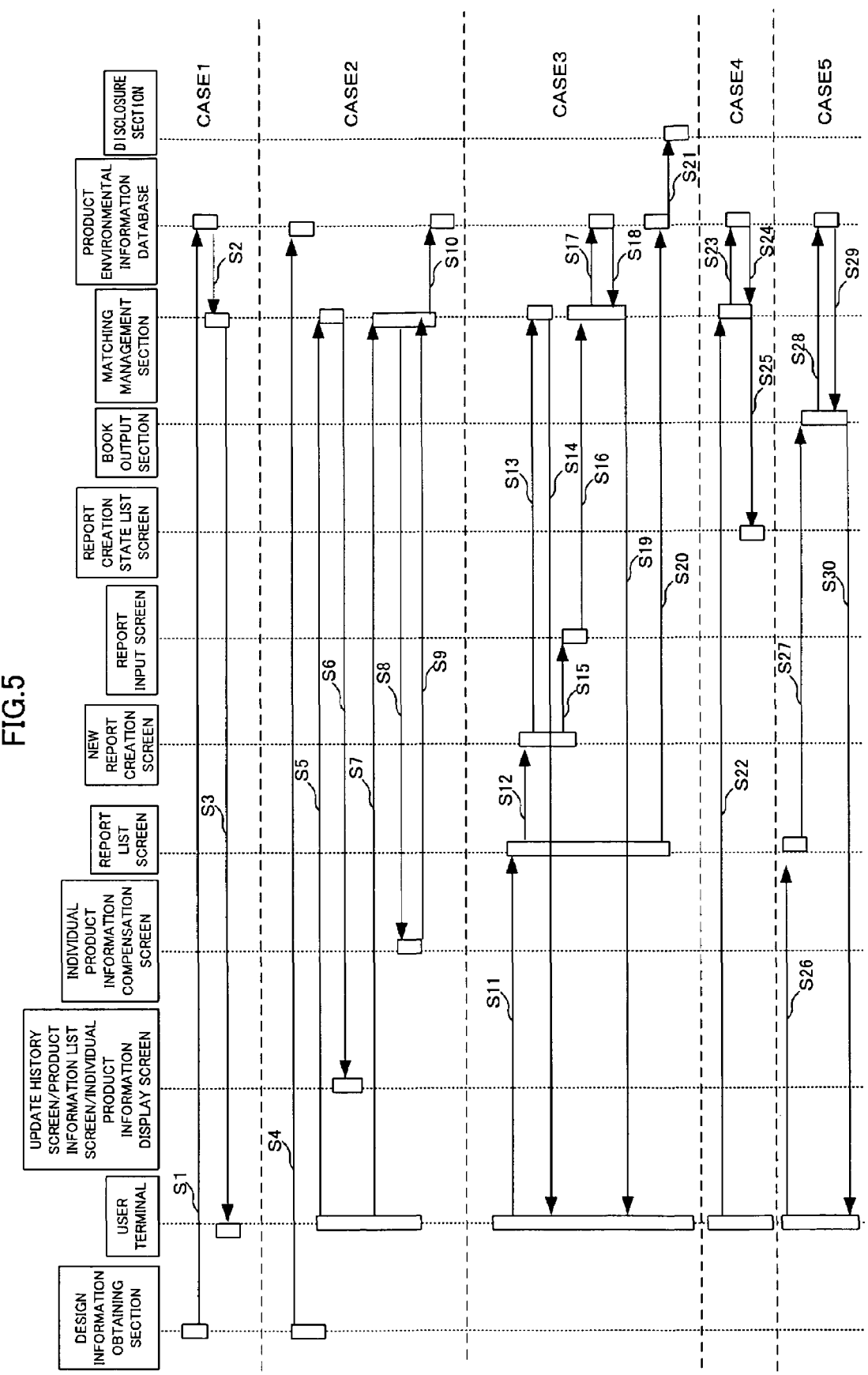
FIG. 5 is a sequence chart showing an example of operation of the product environmental information collection system according to the invention.

Next, FIG. 5 shows a sequence chart in this embodiment. FIG. 5 shows procedures depending on use states of the product environmental information collection system 1 in this embodiment, corresponding to periodical obtaining processing (CASE1) for obtaining individual product information, compensatory registration processing (CASE2) for compensation for individual product information, new report creation processing (CASE3) for creating a new report, confirmation processing (CASE4) for confirming report states and omissions in specification of target products, and book output processing (CASE5). The following description will be made referring to the sequence chart of FIG. 5 and a screen image (FIGS. 6 to 13) on a user terminal 9 in this embodiment. Screens shown as objects at the top of the sequence chart are displayed on the user terminal 9 by the input assist section 4. Further, each report requires evaluations to be inputted in units of representative models. Hence, input screens on the user terminal 9 are configured in the same form as the book of a report as a final result from the design division who inputs information. Users therefore can input data without feeling uncomfortable or confused.

At first, operation of the periodical obtaining processing (CASE1) for periodically obtaining individual product information will be described. The design information obtaining section 5 obtains periodically "individual product information" and "state" ("design completion", "productization postponement", or "productization cancel") for each product from the design information database 8, and stores the information and state into the product environmental information database 7 (step S1). According to this step S1, information specific to individual products contained in the database 8 can be diverted easily for items which need to be inputted for each of individual products. In this manner, environmental information can be established for each of individual products through report creation work. Further, the matching management section 2 manages an update history of "individual product information" accumulated in the product environmental information database 7, and confirms the "state" for each product to know whether or not a critical event ("productization postponement" or "productization cancel") exists (step S2). If a critical event exists, the matching management section 2 notifies the user terminal 9 of the critical event through the input assist section 4 (step S3).

Compensatory registration processing (CASE2) for individual product information will be described next. The design information obtaining section 5 periodically obtains "individual product information" and "state" for each product from the design information database 10, and accumulates the "individual product information" and "state" into the product environmental information database 7 (step S4). If the input assist section 4 is instructed to confirm the update history about data from the user (step S5), the matching management section 2 displays an update history screen as shown in FIG. 6 on the user terminal 9 (step S6). Otherwise, if the input assist section 4 is instructed to confirm information for each product from the user (step S5), the matching management section 2 displays a product information list screen as shown in FIG. 7 on the user terminal 9 (step S6). The user confirms "individual product information" and "state" for each product on the update history screen or product information list screen.

The user can confirm data obtained from the design information database 8 and history of data created or updated by the user by browsing the update history screen shown in FIG. 6. Further, if the user browses the product information list screen shown in FIG. 7 and selects "details" related to a product which the user desires to confirm on the product information list screen (step S5), the matching management section 2 displays an individual product information display screen shown in FIG. 8 on the user terminal 9. Then, the user can confirm detailed content of the product environmental information database 7 by browsing the individual product information display screen (step S6).

The update history screen in FIG. 6 shows a product ID, information type (basic information, spec information, or power information), updated date, updater, and report ID, listed in columns for each update of data. A product information list screen in FIG. 7 shows product IDs, updated dates, and updaters as basic information, and shows updated dates and updaters both for each of spec information and power information. The individual product information display screen in FIG. 8 is an example when "detail" of a certain power information is selected in FIG. 7. Shown in the screen are values such as "power at ∘∘ (time)", "power consumption at section ∘∘", power consumption in mode ∘∘" included in selected power information.

If the user finds through the step S6 a partial omission from individual product information or an item which requires a correction and if the user inputs an instruction about compensation for the individual product information to the input assist section 4 from the individual product information display screen (step S7), the matching management section 2 shows an individual product information compensation screen on the user terminal 9 (step S8). When upload of individual product information (e.g., a CSV format file) is instructed from the user on the individual product information compensation screen shown in FIG. 9 (step S9), the matching management section 2 obtains the individual product information and updates the individual product information in the product environmental information database 7 (step S10). The user can confirm a result of the update on the individual product information display screen shown in FIG. 8. Note that the individual product information compensation screen shown in FIG. 9 shows a column for specifying an individual product information file to be uploaded, an "Upload" button, and an entry guide to be referred to when entering values for the individual product information file.

Report creation processing (CASE3) will be described next. If an instruction about a report list screen is received from the user, the input assist section 4 displays a report list screen shown in FIG. 10 on the user terminal 9 (step S11). The report list screen shows, for each report, items such as a selection check box, a report ID, a report type, a model number, a representative model ID, an updated date, an updater, and a fixed flag. Further, the report list screen shows an "Input report" button, a "Download" button, a "Create a new report" button, a "Make reference" button, and the like. The user can confirm whether or not a report of a pertinent product exists on the report list screen. On the report list screen shown in FIG. 10, reports with OK marked in the "fixed flag" column have already been fixed and do not necessitate creation of a new report. Other reports with "NG" marked in the "fixed flag" column are still being created, and the user can continue creating these reports.

If the user presses the "Create a new report" button on the report list screen, the input assist section 4 displays a new report creation screen shown in FIG. 11 on the user terminal 9 (step S12). The new report creation screen shows a search box and a "Search" button both for searching for a representative model ID, a select menu of products which can be a target of a report to be newly created, and a select window for selecting report types of the report.

Selection of a report as a target to create and selection of report types of the report are on the new report creation screen shown in FIG. 11 displayed by the input assist section 4. If a representative model ID is inputted to the search box on the new report creation screen and the "Search" button is pressed, the representative model ID and products (product IDs) similar to the product of the representative model ID show up in the select window for selecting products. By selecting a plurality of products thus searched for, reports of a selected report type are created at once for selected products. If a product and a report type are selected on the new report creation screen by the user, the input assist section 4 starts up the matching management section 2, which determines whether or not a new report as a target to create can be created (step S13).

The matching management section 2 determines that the new report as a target can be created if there is no report of the same report type on the same product as the new report as a target to create and if the report type as a target conforms with the "input priority" with respect to the product as a target to report (a report of a report type given a higher input priority than the report type of the target has already been fixed). If the matching management section 2 determines that the new report as the target to create can be created, the matching management section 2 registers information (a record) of the new report as the target into the product environmental information database 7 and goes to step S15. Otherwise, if the matching management section 2 determines that the new report as the target cannot be created, the matching management section 2 displays reasons why a new report cannot be created on the user terminal 9 through the input assist section 4 (e.g., a report type to be created in advance, or the same report exits) (step S14). In this way, creation of a report which cannot divert another report can be prevented, and overlapped creation of reports can be prevented.

Next, the input assist section 4 displays a report input screen shown in FIG. 12 (step S15) and allows the user to input necessary items for creation of a report, such as user information (a responsible person's name, post, affiliation, contact address, etc.). The input assist section 4 further obtains, from the product environmental information database 7, basic information (such as a product ID) and individual product information (such as power information) which are related to the product selected on the new report creation screen, and displays both information in pertinent columns of the report.

Meanwhile, if the "Make reference" button is pushed on the report list screen shown in FIG. 10 (step S12), the input assist section 4 obtains information concerning the report being created or fixed, which has been selected on the report list screen shown in FIG. 11. The input assist section 4 further obtains, from the product environmental information database 7, basic information and individual product information which are related to the product selected on the report list screen, and inputs both information into columns of the pertinent report. The input assist section 4 displays both information in the report input screen on the user terminal 9 (step S15). At this stage, the user can efficiently divert existing information by changing only items requiring update among inputted items in the report being created or already fixed. Thus, input can be reused without confusion for overlapping evaluation items between reports, and man-hours required for creation of similar reports can be suppressed greatly.

If a report being created is stored temporarily from the report input screen, the user can suspend input work by pressing a "Save DB" button. The input assist section 4 stores, to product environmental information database 7, the report including data inputted from the product environmental information database 7 and data inputted by the user.

If the user then presses a "Redisplay from DB" button, the report being created on the input screen can be returned to a state as stored in the product environmental information database 7. At this time, the input assist section 4 obtains data now being displayed from the product environmental information database 7 and displays the obtained data again in the report input screen on the user terminal 9.

Further, if the user presses a "Fix" button on the report input screen (step S16) after completion of various input to the report input screen, the matching management section 2 obtains, from the product environmental information database 7, a "fixing requirement" for the report type of the report as a target on the report input screen, and determines whether or not the report as a target satisfies the "fixing requirement" (steps S17 and S18). For example, the "fixing requirement" indicates essential items for a related report type. The matching management section 2 determines the "fixing requirement" to be satisfied if all essential items are filled in the report as a target.

If the report as a target is determined as satisfying the "fixing requirement", the matching management section 2 stores data of the report as a target into the product environmental information database 7 and changes the state of the report as a target to "fixed". Otherwise, if the report as a target is not determined as satisfying the "fixing requirement", the matching management section 2 shows on the user terminal 9 a notification suggesting the user to refill input items correctly with the input assist section 4 (step S19).

Since the content of each report is checked each time when the report is created, reuse of information in each report is feasible.

Further, if at least one report is selected on the report list screen shown in FIG. 10 by the user and the "Input report" button is pressed (step S12), the input assist section 4 obtains data of the report from the product environmental information database 7, and shows the obtained data in the report input screen on the user terminal 9. The processing then goes to step S15. In this manner, the user can update data in the report later.

Alternatively, if at least one "fixed" report is selected on the report list screen shown in FIG. 10 by the user and a "Request approval" button is pressed (step S20), the input assist section 4 obtains data of the report as a target from the product environmental information database 7, and asks the user who has authorization for approval to approve the report as a target. If the report is approved by the user, the disclosure section 6 obtains data of the report as a target from the product environmental information database 7 (step S21), and forwards the data to an external information disclosure system 10. The information disclosure system 10 discloses the data of the report as a target.

Described next will be confirmation processing about report states and omissions of target product specification (CASE4). If the input assist section 4 is instructed to make confirmation by the user terminal 9 (step S22), the matching management section 2 collects necessary information from the product environmental information database 7 (steps S23 and S24), and shows a report creation state list screen as shown in FIG. 13 (step S25). On the report generation state list screen, a product ID and a report ID created for the product are displayed for each product. In this example, "report 01", "report 02", and "report 03" are given as report types and are respectively given input priorities 1, 2, and 3. The report types are displayed in order of the input priorities, and report IDs are respectively displayed corresponding to the report types. On the report creation state list screen, the user can confirm states ("not created", "being created", and "fixed") of all of the reports created for each product and also confirm the order of the input priorities of report types.

Book output processing (CASE5) will be described next. If the user selects at least one report and presses the "Download" button on the report list screen in FIG. 10 (step S26) or another "Download" button on the report input screen in FIG. 12, the book output section 3 receives a book output instruction (step S27). Upon receipt of the book output instruction, the book output section 3 obtains a book format defined by a "book definition body" of the report type of the report as a target, and data of the report as a target, from the product environmental information database 7 (step S28, step S29). The book output section 3 outputs a book (i.e., a file of a report having a form adjusted for display or printing), relating the data of the report as a target to respective items of the book format (step S30). Further, reports can be managed by combining generated books with an electronic approval system or a document management system.

According to the embodiment as has been described above, it is possible to provide a system which can reduce man-hours in the product design division in case where a report as a part of environmental work is shared and created by a plurality of users. In addition, the system can automatically collect and use environmental evaluation information of products which is necessary for environment label application procedures and for responses to inquiries.

Also according to the present embodiment, states of reports ("not created", "being input", and "fixed") can be managed together with states of products ("input available", "publication postponement", "publication start", and "publication cancel"). As a result of this, information from the design information database 8 can be automatically related to portions of reports, with respect to critical information such as postponement or cancel of productization which is an actual event in product design and development, so as to eliminate mismatching. Accordingly, quality of reports can be maintained.

Further, whether or not evaluations have been inputted can be determined for individual products by managing individual product information and states of reports. Accordingly, products which can be subject to secondary use can be selected from data collected by the design information database 8.

Further, information which can be subject to secondary use can be easily created by converting information collected from the design information database 8 into information in units of individual products which extracts only necessary items.

Furthermore, a program which causes a computer constituting a report management device to execute the steps as described above can be provided as a report management program. The program can be executed from the computer constituting a report management device by recording the program on a recording medium readable from computers. The recording medium readable from computers can be an internal storage device such as a RAM or ROM built in a computer, a portable storage medium such as a CD-ROM, flexible disk, DVD disk, magneto-optical disk, or IC card, a database maintaining a computer program, another computer or a database thereof, or further, an online transmission medium.

The design information obtaining section in the embodiment corresponds to the obtaining section in the appended claims. Likewise, the matching management section in the embodiment corresponds to the determination section in the claims. The input assist section together with the book output section in the embodiment corresponds to the creation section in the claims. The step S1 in the embodiment corresponds to the obtaining step in the claims. The steps S13 and S18 in the embodiment correspond to the determination step in the claims. The steps S15 and S16 in the embodiment correspond to the preparation step in the claims. The term of representative model in a product group in the embodiment refers to the first product in the claims, and another product than the representative model in the same product group refers to the second product in the claims. The order of input priorities in the embodiment corresponds to the order of report type priorities in the claims.

What is claimed is:

1. A report management device that manages a report on information concerning a product, comprising:
   an obtaining, section that obtains first information as information concerning, a first product;
   a determination section that determines whether or not a first report on the first product as a report of a predetermined report type can be created, based on order of priorities set as order of priorities given to plural report types that can be created; and
   a creation section that creates, when the determination section determines that the first report can be created, the first report based on the first information obtained by the obtaining section and stores the information of the first report, and
   wherein the determination section manages state information for each report, and based on the state information, determines that the first report can be created when no report exists on a product that is the same as the first product where a report of the first product is given a higher report type priority than a report type priority of the first report, and when creation of a report on the first product having a higher report type priority than a report type priority of the predetermined report type has been completed.

2. The report management device according to claim 1, wherein the first information includes at least one of information concerning design of the first product and information of a report created by the creation section in the past on a product relevant to the first product.

3. The report management device according to claim 1, wherein the state information can be set so as to indicate a fixed state indicating that a related report is fixed, the determination section further determines whether or not content of a report created by the creation section is correct, and the determination section sets the state information of the report to the fixed state when the content is determined to be correct.

4. The report management device according to claim 3, wherein the determination section determines the content to be correct in the report created by the creation section when all essential items that are set depending on a report type of the report have been inputted.

5. The report management device according to claim 3, wherein the state information is further capable of indicating as a being-created state a case that creation of a related report is not started and is not yet fixed, and the determination section determines that the first report cannot be created when the first report is in the fixed state or the being-created state.

6. The report management device according to claim 3, further comprising the disclosure section that discloses a report in the fixed state to outside.

7. The report management device according to claim 1, wherein when the determination section determines that the first report cannot be created, the determination section informs a reason for determination.

8. The report management device according to claim 1, wherein
   the first product is one of at least one product belonging to a product group, and
   the obtaining section further obtains second information other than the first information from information concerning the product group, and based on the first and second information, the creation section further creates a report of the predetermined report type on a second product other than the first product in the product group.

9. The report management device according to claim 8, wherein
   the obtaining section obtains basic information common to the product group, and individual product information that at least one product belonging to the product group is individually related to, and
   the first information includes the basic information of the product group and the individual product information of the first product.

10. The report management device according to claim 9, wherein the second information is individual product information of the second product.

11. The report management device according to claim 9, wherein
   the obtaining section periodically obtains at least one of the basic information and the individual product information from information concerning products.

12. The report management device according to claim 1, wherein the creation section further transforms the first report into a form that is set related to the predetermined report type and outputs the report.

13. The report management device according to claim 1, wherein the information concerning products includes information concerning influence effected on environments from a product as a target.

14. A computer-readable medium having a report management program stored therein for causing a computer to execute operations including management of a report on information concerning a product, said operations comprising:
   obtaining first information as information concerning a first product;
   determining whether or not a first report on the first product as a report of a predetermined report type can be created, based on order of report type priorities set as order of priorities given to plural report types that can be created; and
   creating, when the determining indicates that the first report can be created, the first report based on the first information obtained and stores the information of the first report, and
   wherein the determining manages state information for each report, and based on the state information, determines that the first report can be created when no report exists on a product that is the same as the first product where a report of the first product is given a higher report type priority than a report type priority of the first report, and when creation of a report on the first product having a higher report type priority than a report type priority of the predetermined report type has been completed.

15. The computer-readable medium according to claim 14, wherein the first information includes at least one of information concerning design of the first product and information of a report created in the past on a product relevant to the first product.

16. The computer-readable medium according to claim 14, wherein the state information can be set so as to indicate a fixed state indicating that a related report is fixed, and the determining indicates whether or not content of a report created is correct, and the determination section sets the state information of the report to the fixed state when the content is determined to be correct.

17. The report management program according to claim 16, wherein the determination determines the content of the report created to be correct when all essential items that are set are filled.

18. A report management method that manages a report on information concerning a product, comprising:

obtaining first information as information concerning a first product; determining whether or not a first report on the first product as a report of a predetermined report type can be created, based on order of report type priorities set as order of priorities given to plural report types that can be created; and creating, when said determining indicates that the first report can be created, the first report based on the first information obtained and stores the information of the first report, and wherein the determining manages state information for each report, and based on the state information, determines that the first report can be created when no report exists on a product that is the same as the first product where a report of the first product is given a higher report type priority than a report type priority of the first report, and when creation of a report on the first product having a higher report type priority than a report type priority of the predetermined report type has been completed.

\* \* \* \* \*